(12) United States Patent
Tsukamaki et al.

(10) Patent No.: US 10,636,134 B2
(45) Date of Patent: Apr. 28, 2020

(54) DISPLAY APPARATUS AND METHOD FOR OPTICAL FIBER INSPECTION

(71) Applicant: Fluke Corporation, Everett, WA (US)

(72) Inventors: Scott Tsukamaki, Kirkland, WA (US); J. David Schell, Austin, TX (US); Glenn Keltto, Edmonds, WA (US)

(73) Assignee: Fluke Corporation, Everett, WA (US)

( * ) Notice: Subject to any disclaimer, the term of this patent is extended or adjusted under 35 U.S.C. 154(b) by 43 days.

(21) Appl. No.: 16/125,392

(22) Filed: Sep. 7, 2018

(65) Prior Publication Data

US 2020/0082521 A1    Mar. 12, 2020

(51) Int. Cl.
| | |
|---|---|
| *G06T 7/00* | (2017.01) |
| *H04N 5/44* | (2011.01) |
| *G06F 3/0484* | (2013.01) |
| *G06F 3/0481* | (2013.01) |
| *G06F 3/0488* | (2013.01) |

(52) U.S. Cl.
CPC ......... *G06T 7/0004* (2013.01); *H04N 5/4403* (2013.01); *G06F 3/04817* (2013.01); *G06F 3/04847* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

2018/0040117 A1* 2/2018 Castro ................ H04N 5/23293
2019/0339456 A1* 11/2019 Ruggles .................... G06T 5/50

* cited by examiner

*Primary Examiner* — Christopher Braniff
(74) *Attorney, Agent, or Firm* — Seed Intellectual Property Law Group LLP

(57) ABSTRACT

A display apparatus for optical fiber inspection includes a processor programmed to receive, from a camera, a visual image of an array of endfaces of fiber optic cables being inspected, and to produce, on a display, an inspection interface that includes a first section and a second section. The first section shows a portion of the received image that includes a portion of the endfaces captured in the image. The second section shows a graphical map containing icons that depict representations of the endfaces in the array of endfaces. A selection window identifies the icons representing the endfaces that are currently shown in the first section. In response to user input, the display apparatus correspondingly modifies which endfaces are shown in the first section and modifies the position and/or size of the selection window in the second section.

22 Claims, 7 Drawing Sheets

DISPLAY APPARATUS AND METHOD FOR OPTICAL FIBER INSPECTION

BACKGROUND

Technical Field

The present disclosure generally pertains to visual inspections of fiber optic cables.

Description of the Related Art

Fiber optic cables enable high speed transmission of data with relatively low loss. In view of this, fiber optic cables are often used in telecommunication networks, such as telephone lines, cable systems and the internet. In order to allow for adjustments to a network, such as adding, dropping, or moving optical cables in the network, or for coupling and decoupling to various transmitting and receiving equipment, each end of the fiber optic cables is held by a connector, such as a ceramic ferrule, a bulkhead adapter in a patch panel, etc., that allows for each of coupling and decoupling of the fiber optic cables. The connectors are designed to align the endfaces of the optical fibers of two fiber optic cables to be coupled, and to abut the endfaces of the optical fibers of the fiber optic cables in physical contact with each other.

Performance of the fiber optic cables is affected by the quality of the connection between abutting optical fibers. One element known to affect the quality of the connection is the cleanliness of the endfaces of the optical fibers. For instance, defects between optical fibers of two abutting fiber optic cables may block, diffuse, or misdirect the optical signal traveling from one optical fiber to another abutting optical fiber, thereby affecting the quality of the signal, such as reducing the intensity of the signal or introducing artifacts into the signal. Furthermore, defects may cause damage to endfaces of optical fibers of another fiber optic cable upon coupling of the two fiber optic cables. Defects may include any contamination, artifacts, flaws in the optical fibers, or anything else that may affect an optical signal. Thus, the integrity of the endfaces of optical fibers in a fiber optic cable is of significant importance.

To eliminate or at least reduce problems associated with endface contamination, the endfaces of the optical fibers of the fiber optic cables may be visually inspected to confirm cleanliness. Additionally, the endfaces may be cleaned prior to a visual inspection process.

A visual inspection process typically involves a camera probe that illuminates an endface of optical fibers of a fiber optic cable and obtains images of the endface. The inspection process may include a comparison to endface goodness standards for the intended application of the fiber optic cable. Such standards may be set by the International Electrotechnical Commission (IEC) (e.g., IEC Standard 61300-3-35) or various other organizations that set forth objective requirements for optical communication links, including Telecommunications Industry Association (TIA), Technical Standard Board (TSB), International Organization for Standardization (ISO), and Institute of Electrical and Electronic Engineers (IEEE).

In various configurations, fiber optic cables are coupled to connectors that organize and arrange the endfaces of the fiber optic cables in desired positions forming an array of endfaces. However, when displaying images of an array of endfaces, many displays are not large enough to show all of the endfaces simultaneously at a desired resolution. Accordingly, a display may show only a portion or subset of the endfaces being imaged by a camera, and in such cases, it may be confusing to a user to consistently and correctly identify which endfaces in the array are currently being shown on the display. What is needed, at least in part, is an improved interface for displaying the endfaces of optical fiber cables where the interface provides an improved user experience when navigating various views of the endfaces being inspected.

BRIEF SUMMARY

Embodiments described herein are directed to apparatus and methods for optical fiber inspection that provides an improved interface for visually inspecting the endfaces of the optical fiber cables.

In at least one aspect, described herein is a display apparatus for optical fiber inspection that includes a display and a processor in communication with the display. The processor is programmed to receive, from a camera, a visual image of an array of endfaces of fiber optic cables being inspected, and produce, on the display, an inspection interface that includes at least a first section and a second section.

The first section of the inspection interface shows a portion of the received image that includes some, but not all, of the endfaces captured in the image. The second section shows a graphical map that depicts representations of the endfaces in the array. In at least one embodiment, the graphical map includes icons that individually represent each of the endfaces captured in the image by the camera. A selection window is positioned with respect to the graphical map in the inspection interface to identify the icons that represent the particular endfaces that are currently shown in the first section of the interface.

In accordance with programming of the processor, the inspection interface is configured to receive user input that correspondingly modifies (1) which endfaces are shown in the first section and (2) the position and/or size of the selection window in the second section such that the endfaces shown in the first section are consistently identified in the second section by the icons in the selection window.

In various embodiments, at least a portion of the display may be a touchscreen that receives and detects user input in the form of a swipe gesture. In response to receiving data from the touchscreen indicating a swipe gesture, the processor is programmed to (1) modify the first section of the inspection interface to include a different portion of the image that includes a different portion of the endfaces captured in the image, and (2) modify the position of the selection window with respect to the graphical map in the second section of the inspection interface such that the selection window consistently identifies the icons in the graphical map that represent the endfaces that are currently shown in the first section of the inspection interface.

In response to the touchscreen detecting a swipe gesture that indicates motion toward the right side of the touchscreen, the programming of the processor may cause (1) the first section of the inspection interface to show a portion of the image that is shifted toward the right side of the image received from the camera, and (2) the second section of the inspection interface to show the selection window repositioned toward the right side of the graphical map.

Conversely, in response to the touchscreen detecting a swipe gesture that indicates motion toward the left side of the touchscreen, the programming of the processor may cause (1) the first section of the inspection interface to show a portion of the image that is shifted toward the left side of the image, and (2) the second section of the inspection interface to show the selection window repositioned toward the left side of the graphical map.

In various embodiments, the touchscreen may comprise at least a portion of the first section of the inspection interface. The touchscreen may be configured to detect a tap gesture indicating a user touch of a particular endface shown in the first section of the inspection interface, and in response, the processor may be programmed to modify the first section of the inspection interface to show a portion of the image in which the particular endface is shown enlarged. The touchscreen may also be configured to detect a further tap gesture indicating an additional user touch of the touchscreen, and in response, the processor may be programmed to modify the first section of the inspection interface to show a portion of the image in which the particular endface is shown further enlarged or reduced in size.

In various embodiments, the touchscreen may comprise at least a portion of the second section of the inspection interface. The touchscreen may be configured to detect a tap gesture indicating a user touch of a particular icon depicted in the second section of the inspection interface, and in response, the processor may be programmed to modify the first section of the inspection interface to show a portion of the image in which the endface represented by the particular icon is shown enlarged. The touchscreen may also be configured to detect a further tap gesture indicating an additional user touch of the touchscreen, and in response, the processor may be programmed to modify the first section of the inspection interface to show a portion of the image in which the endface represented by the particular icon is shown further enlarged or reduced in size.

In various embodiments, the user input may be received from an input interface that is located separate from the display.

In some cases, the selection window in the second section of the inspection interface may include a bordered perimeter and the icons representing the endfaces shown in the first section are depicted within the bordered perimeter of the selection window. In some cases, the graphical map in the second section of the inspection interface may be configured to depict icons representing all of the endfaces captured in the image.

In various embodiments, the processor may receive video images from the camera and derive the image of the array of endfaces from the video images. In such embodiments, the processor may automatically update the portion of the image shown in the first section of the inspection interface based on the video images.

In various embodiments, the display apparatus may be integrated into an optical fiber inspection apparatus that includes a camera that is arranged to capture the image of the array of endfaces and communicate the image to the processor. The camera may include a connection port configured to receive multiple different types of connectors having coupled thereto the fiber optic cables being inspected. Each type of connector may have the endfaces of the fiber optic cables being inspected arranged in different arrays. In such embodiments, the display apparatus may be configured to detect the type of connector received by the connection port and thereby identify the array of endfaces presented by the connector. The processor may be programmed to automatically generate the graphical map in the second section of the inspection interface based on the array of endfaces identified by the detected type of the connector.

In various embodiments where at least a portion of the display is a touchscreen, the user input may be a "zoom in" gesture that is detected by the touchscreen. In response to receiving data from the touchscreen indicating a "zoom in" gesture, the processor may be programmed to (1) modify the first section of the inspection interface to include a different portion of the image that includes at least one of the endfaces captured in the image shown enlarged in size based on characteristics of the "zoom in" gesture, and (2) modify the size of the selection window in the second section of the inspection interface such that the selection window consistently identifies at least one icon in the graphical map that represents the at least one endface currently shown in the first section of the inspection interface.

In various embodiments where at least a portion of the display is a touchscreen, the user input may be a "zoom out" gesture that is detected by the touchscreen. In response to receiving data from the touchscreen indicating a "zoom out" gesture, the processor may be programmed to (1) modify the first section of the inspection interface to include a different portion of the image that includes at least one of the endfaces captured in the image shown reduced in size based on characteristics of the "zoom out" gesture, and (2) modify the size of the selection window in the second section of the inspection interface such that the selection window consistently identifies at least one icon in the graphical map that represents the at least one endface currently shown in the first section of the inspection interface.

In at least another aspect described herein, a method for optical fiber inspection may include receiving, from a camera, a visual image of an array of endfaces of fiber optic cables being inspected, and producing, on a display, an inspection interface that includes a first section and a second section.

As previously described, the first section shows a portion of the image that includes a portion, but not all, of the endfaces captured in the image of the endfaces. The second section shows a graphical map that depicts representations of the endfaces in the array of endfaces. In particular, the graphical map includes icons that individually represent each of the endfaces captured in the image by the camera. A selection window is positioned with respect to the graphical map to identify the icons in the graphical map that represent the endfaces that are currently shown in the first section of the inspection interface. In response to receiving user input, the method further includes correspondingly modifying which endfaces are shown in the first section and modifying the position of the selection window in the second section such that the endfaces shown in the first section are consistently identified in the second section by the icons in the selection window.

In various circumstances, the user input may be a swipe gesture that is detected by a touchscreen portion of the display. In response to a swipe gesture, the method may further comprise (1) modifying the first section of the inspection interface to include a different portion of the image that includes a different portion of the endfaces captured in the image, and (2) modifying the position of the selection window with respect to the graphical map in the second section of the inspection interface such that the selection window consistently identifies the icons in the graphical map that represent the endfaces that are currently shown in the first section of the inspection interface.

In various circumstances, the user input may be a zoom gesture that is detected by a touchscreen portion of the display. In response to a zoom gesture, the method may further comprise (1) modifying the first section of the inspection interface to include a different portion of the image that includes at least one of the endfaces captured in the image shown enlarged in size or reduced in size based on characteristics of the zoom gesture, and (2) modifying a size of the selection window in the second section of the inspection interface such that the selection window consistently identifies at least one icon in the graphical map that represents the at least one endface currently shown in the first section of the inspection interface.

The method may also comprise receiving a connector having coupled thereto the fiber optic cables being inspected. The connector may have a type that indicates an arrangement of the endfaces of the fiber optic cables that form the array of endfaces. The method may include detecting the type of the received connector and based on the detected type, identifying the array of endfaces presented by the received connector, and automatically generating the graphical map in the second section of the inspection interface based on the array of endfaces identified by detecting the type of the connector.

DETAILED DESCRIPTION

Described herein are various embodiments of a display apparatus and method that provide an improved inspection interface for displaying the endfaces of optical fiber cables being inspected. The inspection interface provides an improved user experience when the user is navigating various views of the optical fiber endfaces.

Figure 1:
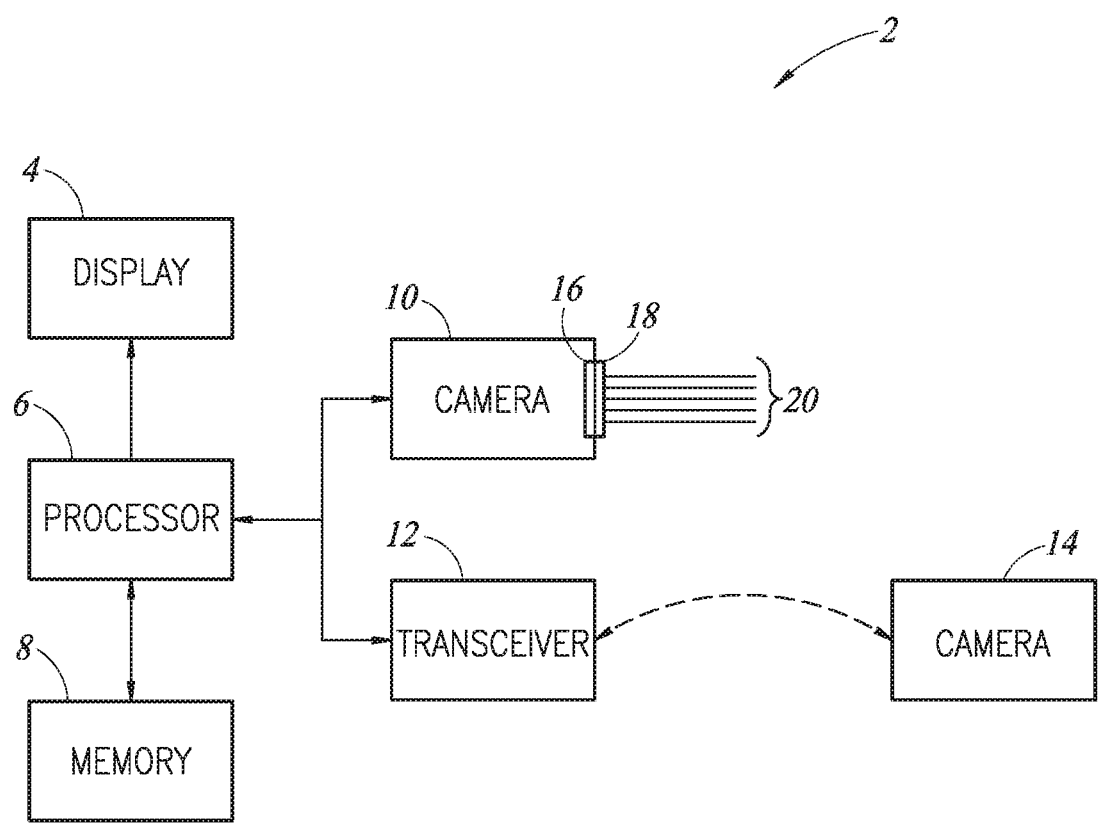
FIG. 1 illustrates a display apparatus in accordance with at least one embodiment of the present disclosure.

FIG. 1 illustrates a display apparatus 2 in accordance with at least one embodiment of the present disclosure. The display apparatus 2 includes a display 4 and a processor 6 in communication with the display 4. The processor 6 may include one or more processing devices that are programmed individually or collectively, whether in software or hardware, to perform various processing tasks described herein. A processor-readable medium, such as a memory 8, may be communicatively coupled to the processor 6. The memory 8 may contain program instructions that are executable by the processor 6, and when executed, cause the processor 6 to perform the processing tasks described herein.

In at least one aspect, the processor 6 is programmed to receive, from a camera, a visual image of an array of endfaces of fiber optic cables being inspected. Accordingly, the processor 6 may be communicatively coupled to a camera 10 that is arranged to (1) capture one or more images of an array of endfaces of fiber optic cables, and (2) provide the one or more images to the processor 6. In at least one embodiment, the camera 10 may be a device that is separate from the display apparatus 2 and coupled by a wired connection to the display apparatus 2 which allows the camera 10 to communicate images of fiber optic endfaces to the processor 6.

Alternatively, or in addition, the processor 6 may be communicatively coupled to a remotely-located camera 14. In this respect, the display apparatus 2 may include a transceiver 12 configured for wireless communication with the remotely-located camera 14. The camera 14 is arranged to capture one or more visual images of an array of fiber optic cable endfaces and provide the one or more images to the processor 6 via the wireless communication link with the transceiver 12. The camera 10 and/or the camera 14 may be comprised of known camera equipment that is configured to digitally capture visual images of fiber optic endfaces.

In some embodiments, the display apparatus 2 may be a multipurpose device, such as a smart phone, a tablet computer, a laptop, or a server computer that is communicatively coupled to a camera 10 or camera 14 configured for imaging optical fiber endfaces. In some embodiments, the display apparatus 2 may be integrated into a special-purpose optical fiber inspection apparatus that includes a camera, such as the camera 10, 14. As shown in FIG. 1, a camera such as the camera 10 (as well as camera 14) may include a connection port 16 configured to receive multiple different types of connectors 18 having the fiber optic cables 20 being inspected coupled thereto. The connection port 16 may be integrated in the camera 10 or may be disposed adjacent to or within a field of view of the camera 10. Each type of connector 18 may arrange the endfaces of the fiber optic cables 20 in different arrays. For example, one type of connector 18 has twelve fiber optic cables 20 coupled thereto which are arranged in a single row. This type of connector 18 is considered as presenting a 1×12 array of endfaces of the fiber optic cables 20 to the camera 10.

Another type of connector 18 has twenty-four fiber optic cables 20 coupled thereto which are arranged in two rows. This type of connector 18 is considered as presenting a 2×12 array of endfaces of the fiber-optic cables 20 to the camera 10.

Yet another type of connector 18 has sixteen fiber optic cables 20 coupled thereto which are arranged in a single row. This type of connector 18 is considered as presenting a 1×16 array of endfaces of the fiber optic cables 20 to the camera 10.

Still another type of connector 18 has thirty-two fiber optic cables 20 coupled thereto which are arranged in two rows. This type of connector 18 is considered as presenting a 2×16 array of endfaces of the fiber optic cables 20 to the camera 10. It should be appreciated that the connector 18 may arrange the endfaces of the fiber optic cables 20 in any desirable array having any number of rows, columns, or other geometric shapes.

The display apparatus 2 may be configured to detect the type of connector 18 that is received by the connection port 16 and identify therefrom the particular array of endfaces presented by the connector 18 to the camera 10. For example, each type of the connector 18 may have a different perimeter or profile that is mechanically or electronically detectable by the display apparatus 2, e.g., using for example one or more electronic switches or visual identification devices located in or around the connection port 16 of the display apparatus 2, when the connector 18 is received into the connection port 16. Alternatively, or in addition, the connector 18 may include circuitry that communicates, by wired or wireless communication, a code to the connection port 16 or other portion of the display apparatus 2 that identifies the particular type of connector 18 being received into the connection port 16.

Figure 2:
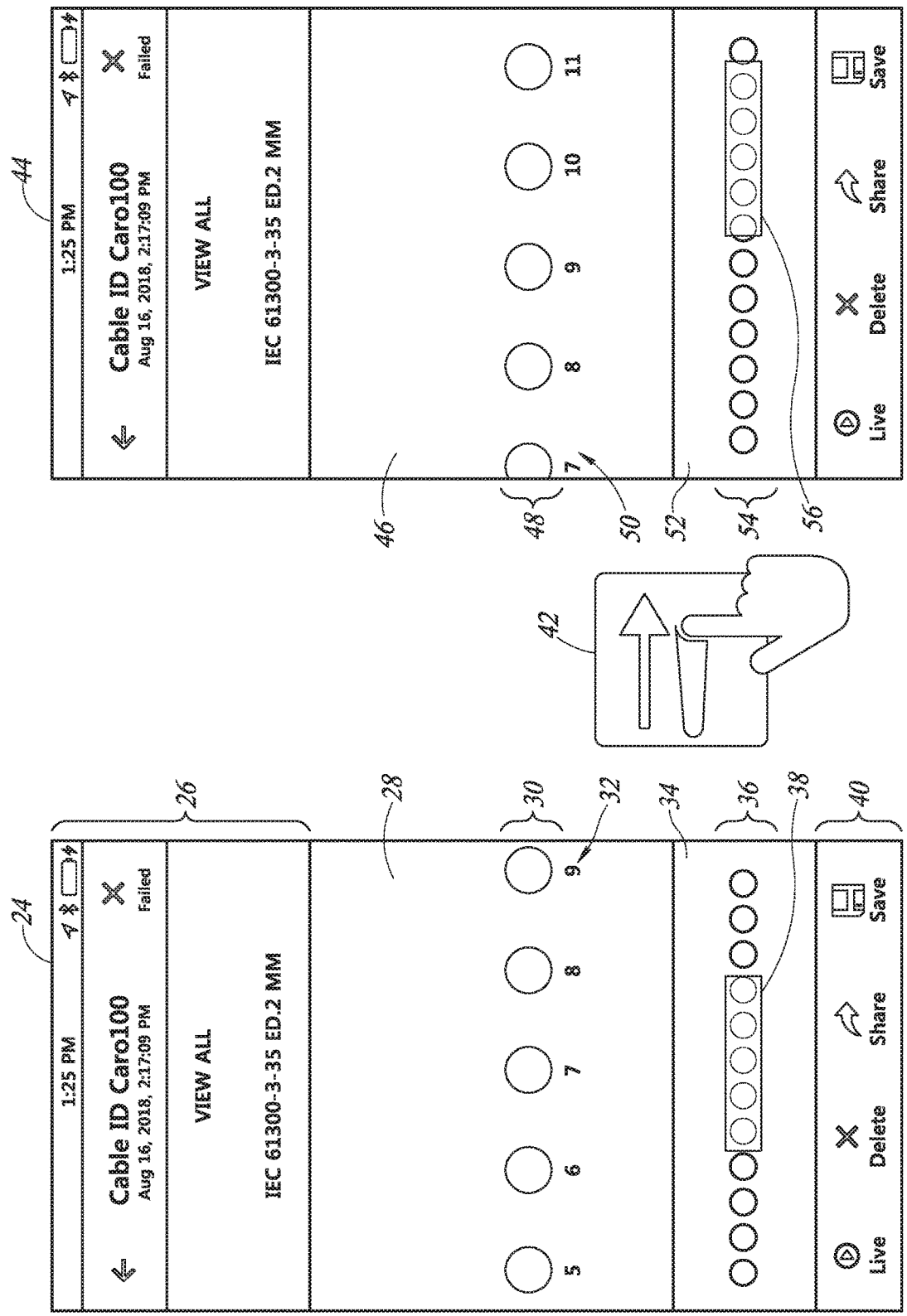
FIG. 2 illustrates an example of an inspection interface that is shown on a display of the display apparatus.

In accordance with various embodiments, the display apparatus 2 provides an improved user interface for visually inspecting the endfaces of optical fibers, such as the fiber optic cables 20 depicted in FIG. 1. FIG. 2 illustrates one example of an inspection interface 24 that is shown by the processor 6 on the display 4 of the display apparatus 2. A preliminary portion 26 of the inspection interface 24 may include icons and/or text that depict and describe functional operations of the display apparatus 2 as well as identify the fiber optic cables being inspected. The preliminary portion 26 may further depict or describe one or more results of the inspection.

A first section 28 of the inspection interface 24 shows a portion of a visual image received from a camera, such as the camera 10 and/or camera 14 shown in FIG. 1. While the visual image received from the camera 10, 14 preferably includes image data depicting all of the endfaces of the fiber optic cables 20 connected to the camera, the portion of the image shown in the first section 28 of the inspection interface 24 includes only some of the endfaces captured in the image. The first section 28 does not necessarily show all of the endfaces captured in the received image. In this particular example, only five endfaces 30 are shown in the first section 28. To aid in identifying the particular endfaces that are currently shown in the first section 28, the portion of the visual image shown in the first section 28 may include or otherwise be annotated to include reference numerals 32 shown adjacent to the endfaces 30. In the example illustrated in FIG. 2, reference numerals "5" through "9" are shown adjacent to the five endfaces 30 indicating the fifth through ninth endfaces of the array being inspected. Reference numerals are not required, however.

The inspection interface 24 further includes a second section 34 that shows a graphical map 36 depicting representations of the array of endfaces of the optical fiber cables 20 being inspected. In contrast to the first section 28 that shows actual visual images of the fiber endfaces, the graphical representations shown in the second section 34 are pictorial illustrations that represent the array of endfaces that can be viewed in the received image. In this example, the graphical map 36 includes twelve circular icons that individually represent each of twelve optical fiber endfaces that are captured in the image by the camera 10, 14. In this example, the processor 6 of the display apparatus 2 has detected the type of connector connected to the camera 10, 14 and identified that the connector contains twelve endfaces arranged in a 1×12 array. Accordingly, the twelve circular icons are shown in the graphical map 36 in a single row. Furthermore, in this instance, the graphical map 36 depicts icons representing all of the endfaces captured in the image, though in other embodiments, the second section 34 may be configured with a scrollable display depicting only a portion of the icons representing the endfaces in the image.

Also depicted in the second section 34 of the inspection interface 24 is a selection window 38. The selection window 38 is positioned with respect to the graphical map 36 to identify the icon or icons in the graphical map 36 that represent the endface or endfaces that are currently shown in the first section 28 of the inspection interface 24. In this example where the first section 28 is shown displaying endfaces "5" through "9", the selection window 38 identifies the fifth through ninth icon in the graphical map 36. In various embodiments, the selection window 38 may include a bordered perimeter as shown in FIG. 2, and the icons representing the endfaces shown in the first section 28 are depicted within the bordered perimeter of the selection window 38. Also as shown in FIG. 2, the icons depicted within the bordered perimeter of the selection window 38 may appear different than the icons depicted outside the bordered perimeter, e.g., by using a different color, pattern, or shade.

Lastly, a final portion 40 of the inspection interface 24 may include icons and/or text that depict and describe additional functional aspects of the display apparatus 2.

Advantageously, the display apparatus 2 is configured to receive user input from a user that is inspecting the endfaces captured in the image by the camera 10, 14. As will be described in greater detail below, the user input may cause the processor 6 to correspondingly modify which endfaces are shown in the first section 28 and modify the position of the selection window 38 in the second section 34 such that the endfaces shown in the first section 28 are consistently identified in the second section 34 by the icons 30 in the selection window 38.

For example, embodiments of the display apparatus 2 may be configured such that at least a portion of the display 4 is a touchscreen. The user input detected by the touchscreen may be a swipe gesture generated by the user's finger or other implement contacting the touchscreen and, while maintaining contact, moving across the surface of the touchscreen. In response to receiving data from the touchscreen indicating a swipe gesture, the processor 6 may be programmed to (1) modify the first section 28 of the inspection interface 24 to include a different portion of the image from the camera that includes a different portion of the endfaces captured in the image, and (2) modify the position of the selection window 38 with respect to the graphical map 36 in the second section 34 of the inspection interface 24 such that the selection window 38 consistently identifies the icons in the graphical map 36 that represent the particular endfaces that are currently shown in the first section 38 of the inspection interface 24.

In the example shown in FIG. 2, the touchscreen may detect a swipe gesture 42 indicating motion toward a right side of the touchscreen. In response, the processor 6 may cause the first section of the inspection interface to show a portion of the image that is shifted toward a right side of the image as illustrated by the inspection interface 44. The inspection interface 44 is shown on the same display as the inspection interface 24, and represents only a progressive change of the appearance of the inspection interface, i.e., from the inspection interface 24 to the inspection interface 44.

In the inspection interface 44, the portion of the image shown in the first section 46 is shown shifted toward the right side of the image as evidenced by showing the seventh through eleventh endfaces 48 annotated by the reference numerals 50 indicating endfaces "7" through "11".

Notably, in response to the swipe gesture 42, the processor 6 is also caused to modify the second section 52 of the inspection interface 44 to show the selection window 56 repositioned toward a right side of the graphical map 54. In the graphical map 54, the selection window 56 identifies the seventh through eleventh icon in the array of icons representing the endfaces captured in the image by the camera 10, 14. By repositioning the selection window 56 in the graphical map 54 (as compared to the position of the selection window 38 in the graphical map 36), the user viewing the inspection interface 44 can readily identify which endfaces of the array of endfaces are currently being shown in the portion of the image shown in the first section 46. As may be readily appreciated, this is particularly useful in embodiments of the display apparatus 2 that do not include reference numerals 32, 50 next to the endfaces shown in the first section 28, 46. In such embodiments, the user can see which icons are within the selection window 38, 56, and readily understand which endfaces 30, 48 are currently shown in the first section 28, 46 of the inspection interface 24, 44.

Figure 3:
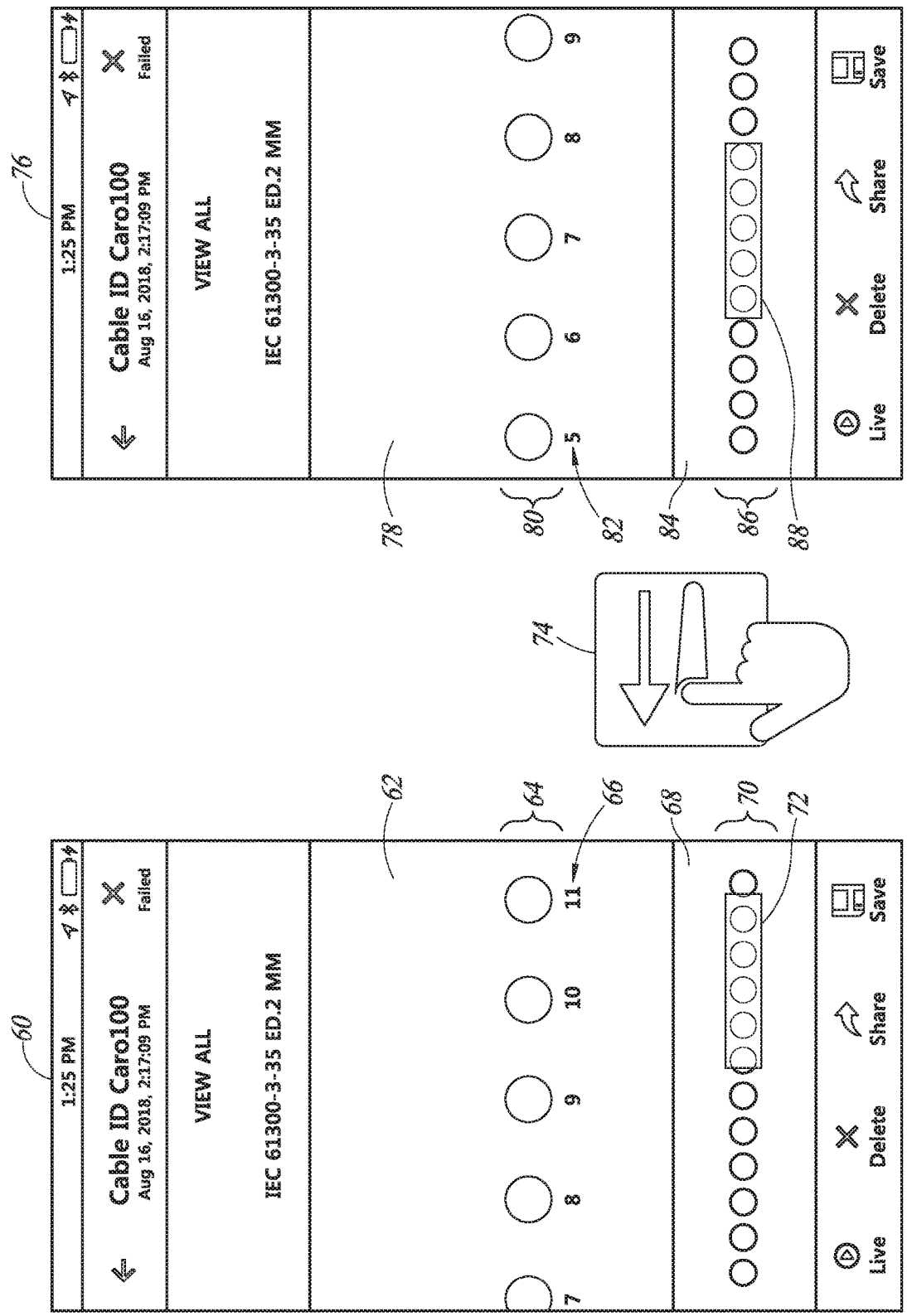
FIG. 3 illustrates another example of an inspection interface that shows a change in appearance of the inspection interface in response to user input received by the display apparatus.

FIG. 3 illustrates another progression of appearance of an inspection interface 60, 76 that shows a change of the inspection interface in response to user input received by the display apparatus 2. Similar to the instances of the inspection interface 24, 44 shown in FIG. 2, the instances of the inspection interface 60, 76 in FIG. 3 respectively include a first section 62, 78 that shows a portion of the image received from the camera, wherein the image portion shown includes some, but not all, of the endfaces captured in the image. In this example, the first section 62 shows a portion of the image that includes the seventh through the eleventh endfaces 64, much like the instance of the inspection interface 44 shown in FIG. 2. The seventh through the eleventh endfaces are identified in the first section 62 by reference numerals 66.

The inspection interface 60, 76 includes a second section 68, 84 that respectively shows a graphical map 70, 86 depicting representations of the endfaces in the array of endfaces. In this example, the graphical map 70, 86 includes circular icons that individually represent each of the endfaces captured in the image received from the camera 10, 14.

The second section 68, 84 respectively includes a selection window 72, 88 that is positioned with respect to the graphical map 70, 86 to identify the icons in the graphical map 70, 86 that represent the particular endfaces 64, 80 that are currently shown in the first section 62, 78 of the inspection interface 60, 76. In this example, the touchscreen of the display apparatus 2 detects a swipe gesture 74 indicating motion toward a left side of the touchscreen, and in response, the processor 6 causes the first section 62 of the inspection interface 60 to show a portion of the image that is shifted toward a left side of the image, e.g., as shown by the first section 78 of the inspection interface 76. Correspondingly, the processor 6 also causes the second section 68 of the inspection interface 60 to alter its appearance as shown by the second section 84 in the inspection interface 76 where the selection window 88 is shown repositioned toward a left side of the graphical map 86 (as compared to the position of the selection window 72 in the graphical map 70 of the inspection interface 60). As can be seen, the selection window 88 encompasses the fifth through ninth icon in the graphical map 86 indicating that endfaces "5" through "9" are shown by the image portion shown in the first section 78.

Figure 4:
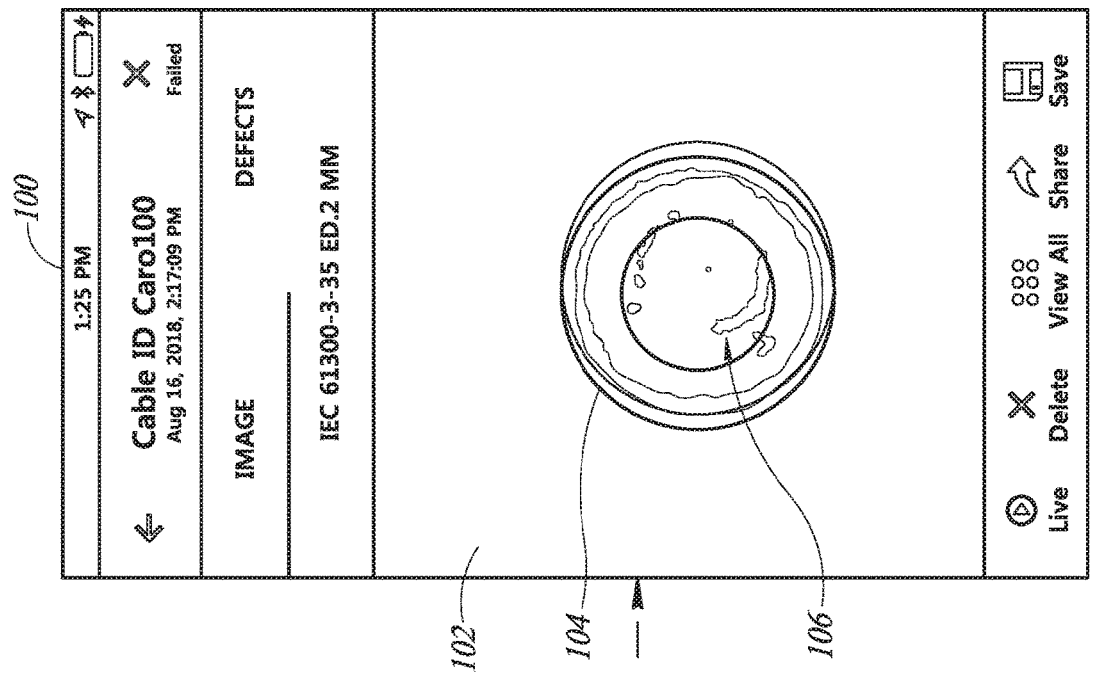
FIG. 4 illustrates another example of an inspection interface that shows a change in appearance of the inspection interface in response to user input received by the display apparatus.
Figure 4:
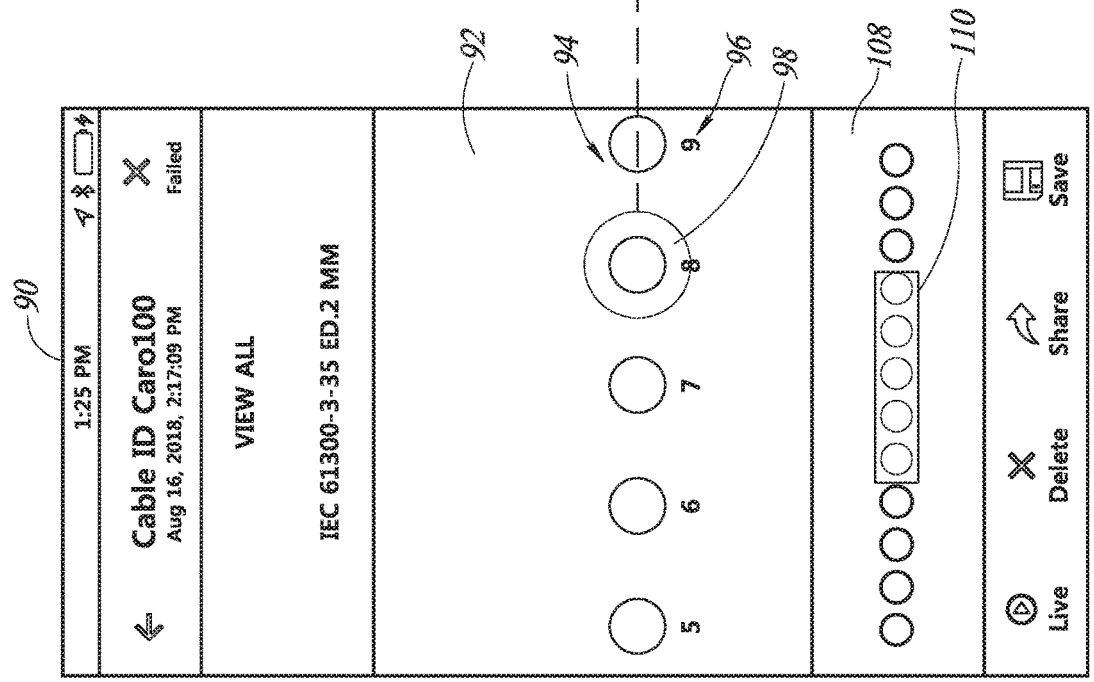

FIG. 4 illustrates another pair of inspection interfaces 90, 100 that shows a change in appearance of the inspection interface in response to user input received by the display apparatus 2. Similar to the instances of the inspection interface 24, 44 shown in FIG. 2, the instances of the inspection interface 90, 100 in FIG. 4 respectively include a first section 92, 102 that shows a portion of the image received from the camera, wherein the image portion shown includes a portion, but not all, of the endfaces captured in the image. In this example, the first section 92 shows a portion of the image that includes the fifth through the ninth endfaces 94, much like the instance of the inspection interface 44 shown in FIG. 2. The fifth through the ninth endfaces 94 are identified in the first section 92 by reference numerals 96.

The inspection interface 90 includes a second section 108 that shows a graphical map of icons representing the endfaces in the array of endfaces captured in the image, and a selection window 110 is positioned with respect to the graphical map to identify the icons in the graphical map representing the fifth through ninth endfaces 94 that are currently shown in the first section 92 of the inspection interface 90.

In this example, the touchscreen of the display apparatus 2 detects a tap gesture indicating a user touch of a particular endface 98 shown in the first section 92 of the inspection interface 90. In response, the processor 6 is programmed to modify the first section 92 of the inspection interface 90 to appear as illustrated by the first section 102 of the inspection interface 100 in which a portion of the image is shown where the particular endface 104 is now shown enlarged. By enlarging the visual image of the endface 104, contaminants 106 on the endface 104 are more easily seen.

Additionally, the touchscreen may be configured to detect a further tap gesture indicating an additional user touch of the touchscreen. In response to the further tap gesture, the processor may be programmed to modify the first section 102 of the inspection interface 100 to show a portion of the image in which the particular endface 104 is shown further enlarged or reduced in size (e.g., as shown by the endface 98 in the instance of the inspection interface 90). Alternatively, or in addition, the touchscreen may be configured to detect a tap gesture indicating a user touch of a particular icon depicted in the second section 108 of the inspection interface 90, and in response, the processor may be programmed to modify the first section 92 of the inspection interface 90 to appear as the first section 102 of the inspection interface 100, i.e., to show a portion of the image in which the endface 104 represented by the particular icon tapped is shown enlarged. Additionally, the touchscreen may be configured to detect a further tap gesture indicating an additional user touch of the touchscreen, and in response, the processor may modify the first section 104 of the inspection interface 100 to show a portion of the image in which the endface 104 represented by the particular icon is shown further enlarged or reduced in size.

In the embodiments of the display apparatus 2 described herein, it should be appreciated that when the display 4 of the display apparatus 2 includes a touchscreen, the touchscreen may comprise at least a portion of the first section of the inspection interface and/or the second section of the inspection interface. In other words, the user may touch either or both the first section of the inspection interface and/or the second section of the inspection interface to provide gesture input to the processor 6. Alternatively, or in addition, the user may provide user input to the display apparatus 2 via an input interface located separate from the display 4.

In various embodiments, the processor 6 may receive video images from the camera 10, 14 and derive the image of the array of endfaces from the received video images. In such embodiments, the processor may automatically update the portion of the image shown in the first section of the inspection interface based on the video images (e.g., by displaying more current images of the array of endfaces derived from more current images in the video images received from the camera 10, 14).

Figure 5:
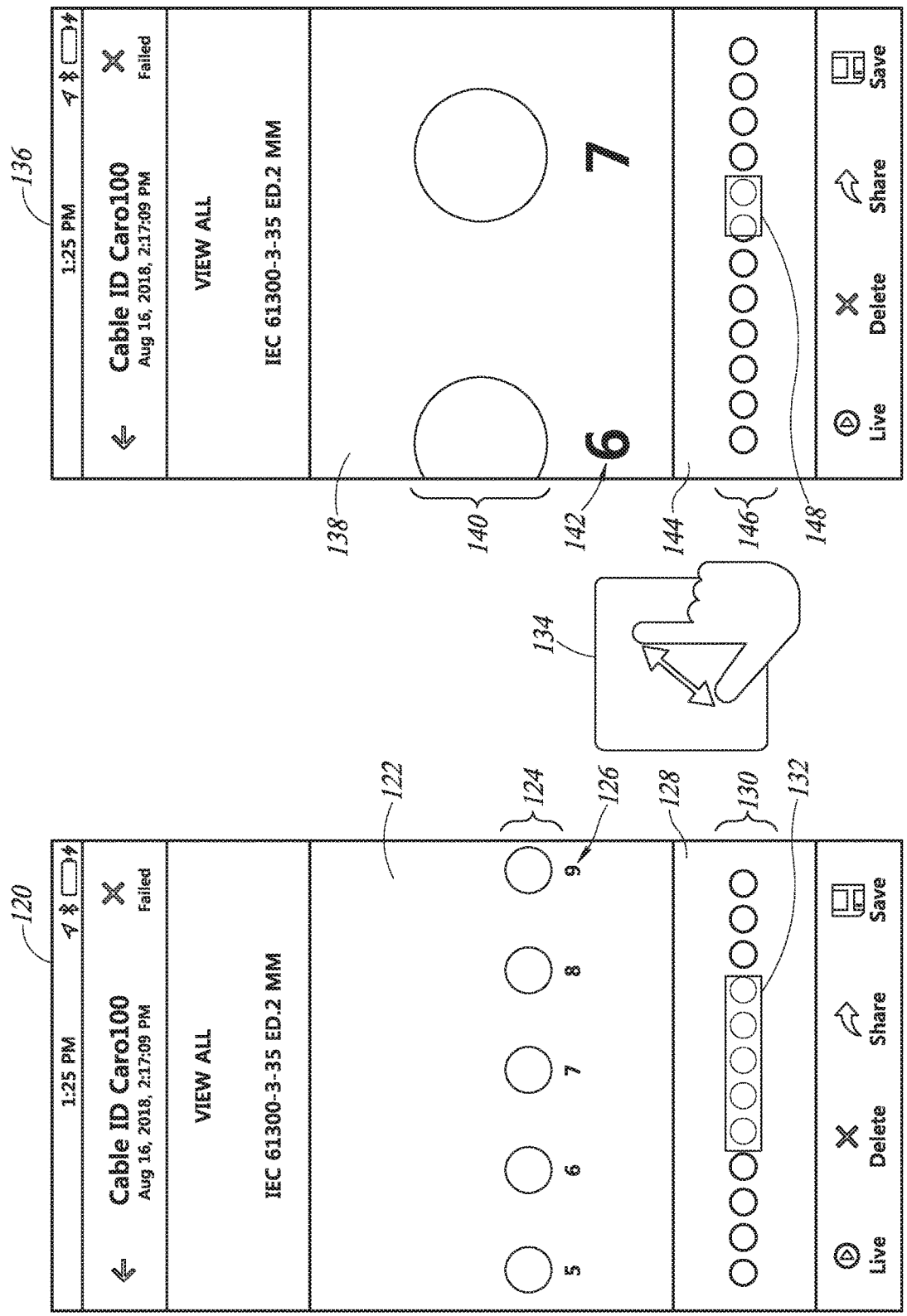
FIG. 5 illustrates yet another example of an inspection interface that shows a change in appearance of the inspection interface in response to user input received by the display apparatus.

FIG. 5 illustrates yet another pair of inspection interfaces 120, 136 that show a change in appearance of the inspection interface in response to user input received by the display apparatus 2. Similar to the instances of the inspection interface 24, 44 shown in FIG. 2, the instances of the inspection interface 120, 136 in FIG. 5 respectively include a first section 122, 138 that shows a portion of the image received from the camera, wherein the image portion shown includes some, but not all, of the endfaces captured in the image. In this example, the first section 122 shows a portion of the image that includes the fifth through the ninth endfaces 124, much like the instance of the inspection interface 24 shown in FIG. 2. The fifth through the ninth endfaces 124 are identified in the first section 122 by reference numerals 126.

The inspection interface 120, 136 respectively includes a second section 128, 144 that shows a graphical map of icons 130, 146 representing the endfaces in the array of endfaces captured in the received image. A selection window 132 is positioned with respect to the graphical map 130 to identify the icons in the graphical map 130 representing the fifth through ninth endfaces 124 that are currently shown in the first section 122 of the inspection interface 120.

In this example, the touchscreen of the display apparatus 2 detects a "zoom in" gesture 134 indicated by touch input received from the user of the display apparatus 2. In response, the processor 6 is programmed to modify the first section 122 of the inspection interface 120 to appear as illustrated by the first section 138 of the inspection interface 136 in which a portion of the image is shown with the endfaces 124 now shown enlarged, e.g., as shown by endfaces 140 shown in the inspection interface 136. In this example, the portion of the image shown in the first section 138 shows the sixth and seventh fiber optic endfaces enlarged for further inspection, based on characteristics of the "zoom in" gesture, as indicated by the reference numerals 142. By enlarging the visual image of the endfaces 124, contaminants on the endfaces 140 may be more easily seen.

In response to the "zoom in" gesture 134, the processor 6 is further programmed to modify the size of the selection window 132 in the second section 128 of the inspection interface 120 such that the selection window 148, now shown smaller in size in the second section 144 of the inspection interface 136, consistently identifies at least one icon in the graphical map 146 that represents at least one endface 140 currently shown in the first section 138 of the inspection interface 136.

Figure 6:
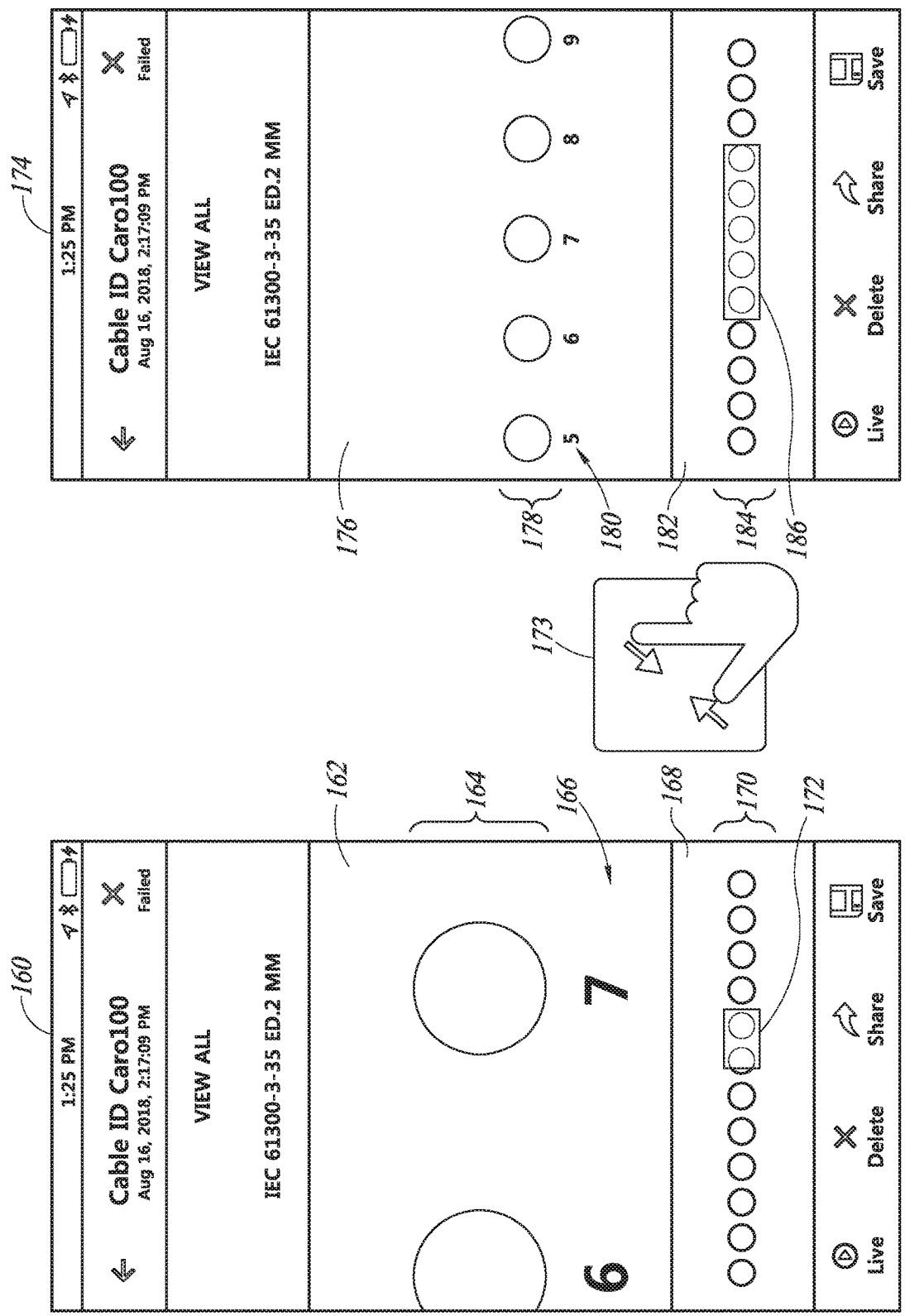
FIG. 6 illustrates still another example of an inspection interface that shows a change in appearance of the inspection interface in response to user input received by the display apparatus.

FIG. 6 illustrates still another pair of inspection interfaces 160, 174 that shows a change in appearance of the inspection interface in response to user input received by the display apparatus 2. Similar to the instances of the inspection interface 24, 44 shown in FIG. 2, the instances of the inspection interface 160, 174 in FIG. 6 respectively include a first section 162, 176 that shows a portion of the image received from the camera. The image portion shown includes a portion, but not all, of the endfaces captured in the image. In this example, the first section 162 shows a portion of the image that includes the sixth and seventh endfaces 164, much like the instance of the inspection interface 136 shown in FIG. 5. The sixth and seventh endfaces 164 are identified in the first section 162 by reference numerals 166.

The inspection interface 160, 174 respectively includes a second section 168, 182 that shows a graphical map of icons 170, 184 representing the endfaces in the array of endfaces captured in the image. A selection window 172 is positioned with respect to the graphical map 170 to identify the icons in the graphical map representing the sixth and seventh endfaces 164 that are currently shown in the first section 162 of the inspection interface 160.

In this example, the touchscreen of the display apparatus 2 detects a "zoom out" gesture 173 indicated by touch input received from the user of the display apparatus 2. In response, the processor 6 is programmed to modify the first section 162 of the inspection interface 160 to appear as illustrated by the first section 176 of the inspection interface 174 in which a portion of the image is shown with the endfaces 164 now shown reduced in size, e.g., as shown by endfaces 178 shown in the inspection interface 174. In this example, the portion of the image shown in the first section 176 shows the fifth through ninth fiber optic endfaces, as indicated by the reference numerals 180, reduced in size as compared to the endfaces 164 shown in the inspection interface 160.

In response to the "zoom out" gesture 173, a different portion of the received image is shown in the first section 176 to now show the fifth through the ninth fiber optic endfaces, reduced in size based on characteristics of the "zoom out" gesture. The processor 6 is further programmed to modify the size of the selection window 172 in the second section 168 of the inspection interface 160 such that the selection window 186, now shown larger in size in the second section 182 of the inspection interface 174, consistently identifies the icon or icons in the graphical map 184 that represents the endface or endfaces 178 currently shown in the first section 176 of the inspection interface 174.

Figure 7:
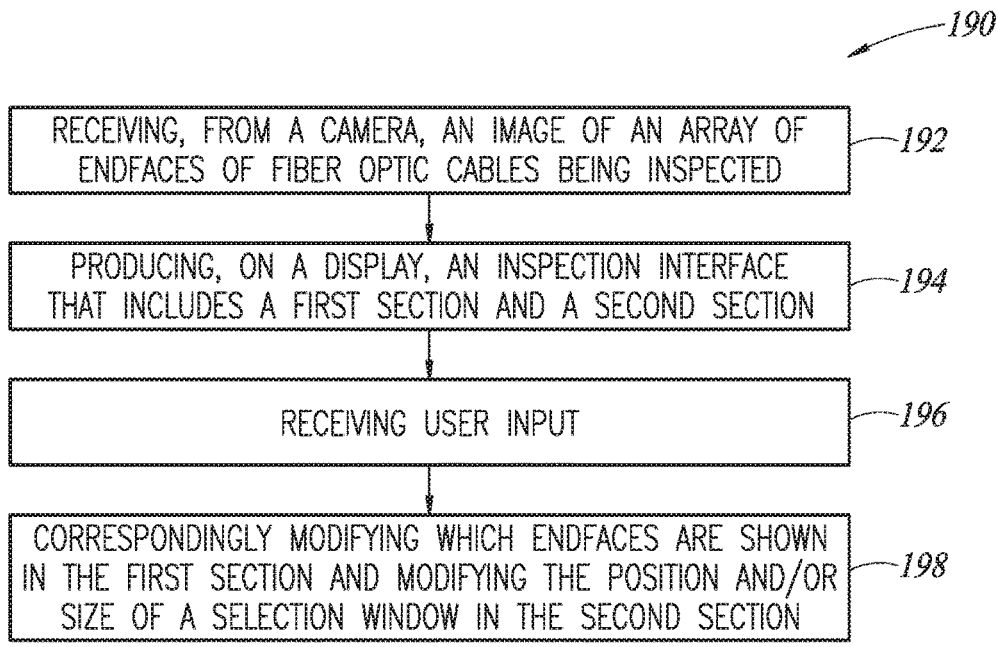
FIG. 7 is a flowchart illustrating a method for optical fiber inspection according to at least one embodiment of the present disclosure.

In accordance with various embodiments described above, the present disclosure also includes various embodiments of a method for optical fiber inspection. In at least one embodiment shown in FIG. 7, a method 190 comprises receiving, from a camera, a visual image of an array of endfaces of fiber optic cables being inspected, as indicated by block 192.

As indicated by block 194, the method further includes producing, on a display, an inspection interface that includes a first section and a second section. As described above, the first section shows a portion of the image that includes a portion of the endfaces captured in the image but not all of the endfaces captured in the image. The second section shows a graphical map depicting representations of the endfaces in the array, wherein the graphical map includes icons that individually represent each of the endfaces captured in the image. Moreover, a selection window is shown positioned with respect to the graphical map to identify the icons in the graphical map that represent the endfaces that are currently shown in the first section.

In response to receiving user input as indicated by block 196, the method includes correspondingly modifying which endfaces are shown in the first section and modifying the position of the selection window in the second section such that the endfaces shown in the first section are consistently identified in the second section by the icons in the selection window, as indicated by block 198.

The user input may be a swipe gesture detected by a touchscreen portion of the display. In response to a swipe gesture, the method further comprises modifying the first section of the inspection interface to include a different portion of the image that includes a different portion of the endfaces captured in the image, and modifying the position of the selection window with respect to the graphical map in the second section of the inspection interface such that the selection window consistently identifies the icons in the graphical map that represent the endfaces that are currently shown in the first section of the inspection interface.

Alternatively, or in addition, the user input may be a zoom gesture detected by a touchscreen portion of the display. In response to a zoom gesture, the method further comprises modifying the first section of the inspection interface to include a different portion of the image that includes at least one of the endfaces captured in the image shown enlarged in size or reduced in size based on characteristics of the zoom gesture, and modifying a size of the selection window in the second section of the inspection interface such that the selection window consistently identifies at least one icon in the graphical map that represents the at least one endface currently shown in the first section of the inspection interface.

Figure 8:
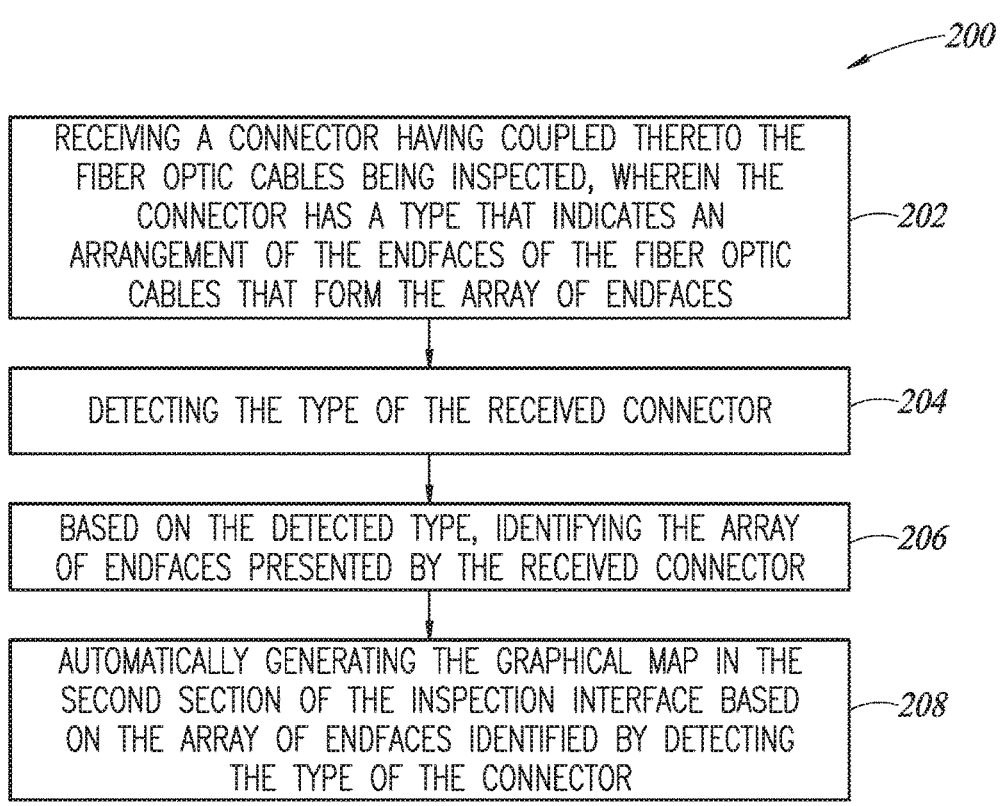
FIG. 8 is a flowchart illustrating another method for use in optical fiber inspection.

In accordance with various embodiments described above, the present disclosure further includes additional aspects of a method for optical fiber inspection. In at least one embodiment shown in FIG. 8, a method 200 comprises receiving a connector having coupled thereto the fiber optic cables being inspected. The received connector has a type that indicates an arrangement of the endfaces of the fiber optic cables that form the array of endfaces, as indicated by block 202.

As indicated by block 204, the method 200 includes detecting the type of the received connector, and based on the detected type, as indicated by block 206, the method 200 includes identifying the array of endfaces presented by the received connector.

Having identified the array of endfaces presented by the received connector, the method 200 further includes automatically generating the graphical map in the second section of the inspection interface based on the array of endfaces identified by detecting the type of the connector.

The various embodiments described above can be combined to provide further embodiments. For example, embodiments of the present disclosure are not limited to inspecting optical fiber endfaces arranged in arrays comprising a single row of endfaces as illustrated (see, e.g., U.S. application Ser. No. 29/662,739, filed Sep. 7, 2018, assigned to the assignee of the present disclosure and incorporated by reference herein). Rather, the inspection interface is suitable for use with arrays of endfaces having multiple rows or columns, or any other geometric shape, with a consequent graphical depiction of the particular array being inspected shown in the second section of the inspection interface. Also, while user input in the form of zoom and swipe gestures on a touchscreen are described for use in navigating the views of the endfaces shown in the inspection interface, other forms of user input may be received and used, such as keystrokes, touch pad, or mouse input.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus for optical fiber inspection, comprising:
    a display; and
    a processor in communication with the display, wherein the processor is programmed to:
        receive, from a camera, a visual image of an array of endfaces of fiber optic cables being inspected, and produce, on the display, an inspection interface that includes:
            a first section that shows a portion of the image that includes a portion of the endfaces captured in the image but not all of the endfaces captured in the image; and
            a second section that shows:
                a graphical map depicting representations of the endfaces in the array, wherein the graphical map includes icons that individually represent each of the endfaces captured in the image; and
                a selection window positioned with respect to the graphical map to identify the icons in the graphical map that represent the endfaces that are currently shown in the first section; and
        receive user input that correspondingly modifies which endfaces are shown in the first section and modifies the position of the selection window in the second section such that the endfaces shown in the first section are consistently identified in the second section by the icons in the selection window.

2. The display apparatus of claim 1, wherein at least a portion of the display is a touchscreen and the user input is a swipe gesture detected by the touchscreen, and wherein in response to receiving data from the touchscreen indicating the swipe gesture, the processor is programmed to:
    modify the first section of the inspection interface to include a different portion of the image that includes a different portion of the endfaces captured in the image; and
    modify the position of the selection window with respect to the graphical map in the second section of the inspection interface such that the selection window consistently identifies the icons in the graphical map that represent the endfaces that are currently shown in the first section of the inspection interface.

3. The display apparatus of claim 2, wherein the touchscreen detects a swipe gesture indicating motion toward a right side of the touchscreen, and in response, the processor causes:
    the first section of the inspection interface to show a portion of the image that is shifted toward a right side of the image; and
    the second section of the inspection interface to show the selection window repositioned toward a right side of the graphical map.

4. The display apparatus of claim 2, wherein the touchscreen detects a swipe gesture indicating motion toward a left side of the touchscreen, and in response, the processor causes:
    the first section of the inspection interface to show a portion of the image that is shifted toward a left side of the image; and
    the second section of the inspection interface to show the selection window repositioned toward a left side of the graphical map.

5. The display apparatus of claim 2, wherein the touchscreen comprises at least a portion of the first section of the inspection interface.

6. The display apparatus of claim 5, wherein the touchscreen is configured to detect a tap gesture indicating a user touch of a particular endface shown in the first section of the inspection interface, and in response, the processor is programmed to modify the first section of the inspection interface to show a portion of the image in which the particular endface is shown enlarged.

7. The display apparatus of claim 6, wherein the touchscreen is configured to detect a further tap gesture indicating an additional user touch of the touchscreen, and in response, the processor is programmed to modify the first section of the inspection interface to show a portion of the image in which the particular endface is shown further enlarged or reduced in size.

8. The display apparatus of claim 2, wherein the touchscreen comprises at least a portion of the second section of the inspection interface.

9. The display apparatus of claim 8, wherein the touchscreen is configured to detect a tap gesture indicating a user touch of a particular icon depicted in the second section of the inspection interface, and in response, the processor is programmed to modify the first section of the inspection interface to show a portion of the image in which the endface represented by the particular icon is shown enlarged.

10. The display apparatus of claim 9, wherein the touchscreen is configured to detect a further tap gesture indicating an additional user touch of the touchscreen, and in response, the processor is programmed to modify the first section of the inspection interface to show a portion of the image in which the endface represented by the particular icon is shown further enlarged or reduced in size.

11. The display apparatus of claim 1, wherein the user input is received from an input interface located separate from the display.

12. The display apparatus of claim 1, wherein the selection window in the second section includes a bordered perimeter and the icons representing the endfaces shown in the first section are depicted within the bordered perimeter of the selection window.

13. The display apparatus of claim 1, wherein the graphical map in the second section of the inspection interface depicts icons representing all of the endfaces captured in the image.

14. The display apparatus of claim 1, wherein processor receives video images and derives the image of the array of endfaces from the video images, and wherein the processor automatically updates the portion of the image shown in the first section of the inspection interface based on the video images.

15. The display apparatus of claim 1, wherein the display apparatus is integrated into an optical fiber inspection apparatus that includes a camera, and wherein the camera is arranged to capture the image of the array of endfaces and communicate the image to the processor.

16. The display apparatus of claim 15, wherein the camera includes a connection port configured to receive multiple different types of connectors having coupled thereto the fiber optic cables being inspected, each type of connector having the endfaces of the fiber optic cables being inspected arranged in different arrays,
wherein display apparatus is configured to detect the type of connector received by the connection port and identify the array of endfaces presented by the connector, and
wherein the processor is programmed to automatically generate the graphical map in the second section of the inspection interface based on the array of endfaces identified by the detection of the type of the connector.

17. The display apparatus of claim 1, wherein at least a portion of the display is a touchscreen and the user input is a zoom in gesture detected by the touchscreen, and wherein in response to receiving data from the touchscreen indicating the zoom in gesture, the processor is programmed to:
modify the first section of the inspection interface to include a different portion of the image that includes at least one of the endfaces captured in the image shown enlarged in size based on the zoom in gesture; and
modify a size of the selection window in the second section of the inspection interface such that the selection window consistently identifies at least one icon in the graphical map that represents the at least one endface currently shown in the first section of the inspection interface.

18. The display apparatus of claim 1, wherein at least a portion of the display is a touchscreen and the user input is a zoom out gesture detected by the touchscreen, and wherein in response to receiving data from the touchscreen indicating the zoom out gesture, the processor is programmed to:
modify the first section of the inspection interface to include a different portion of the image that includes at least one of the endfaces captured in the image shown reduced in size based on the zoom out gesture; and
modify a size of the selection window in the second section of the inspection interface such that the selection window consistently identifies at least one icon in the graphical map that represents the at least one endface currently shown in the first section of the inspection interface.

19. A method for optical fiber inspection, comprising:
receiving, from a camera, a visual image of an array of endfaces of fiber optic cables being inspected;
producing, on a display, an inspection interface that includes:
a first section that shows a portion of the image that includes a portion of the endfaces captured in the image but not all of the endfaces captured in the image; and
a second section that shows:
a graphical map depicting representations of the endfaces in the array, wherein the graphical map includes icons that individually represent each of the endfaces captured in the image; and
a selection window positioned with respect to the graphical map to identify the icons in the graphical map that represent the endfaces that are currently shown in the first section; and
in response to receiving user input, correspondingly modifying which endfaces are shown in the first section and modifying the position of the selection window in the second section such that the endfaces shown in the first section are consistently identified in the second section by the icons in the selection window.

20. The method of claim 19, wherein the user input is a swipe gesture detected by a touchscreen portion of the display, and in response to the swipe gesture, the method further comprises:
modifying the first section of the inspection interface to include a different portion of the image that includes a different portion of the endfaces captured in the image; and
modifying the position of the selection window with respect to the graphical map in the second section of the inspection interface such that the selection window consistently identifies the icons in the graphical map that represent the endfaces that are currently shown in the first section of the inspection interface.

21. The method of claim 19, wherein the user input is a zoom gesture detected by a touchscreen portion of the display, and in response to the zoom gesture, the method further comprises:
- modifying the first section of the inspection interface to include a different portion of the image that includes at least one of the endfaces captured in the image shown enlarged in size or reduced in size based on the zoom gesture; and
- modifying a size of the selection window in the second section of the inspection interface such that the selection window consistently identifies at least one icon in the graphical map that represents the at least one endface currently shown in the first section of the inspection interface.

22. The method of claim 19, further comprising:
- receiving a connector having coupled thereto the fiber optic cables being inspected, wherein the connector has a type that indicates an arrangement of the endfaces of the fiber optic cables that form the array of endfaces;
- detecting the type of the received connector and based on the detected type, identifying the array of endfaces presented by the received connector; and
- automatically generating the graphical map in the second section of the inspection interface based on the array of endfaces identified by detecting the type of the connector.

* * * * *